UNITED STATES PATENT OFFICE.

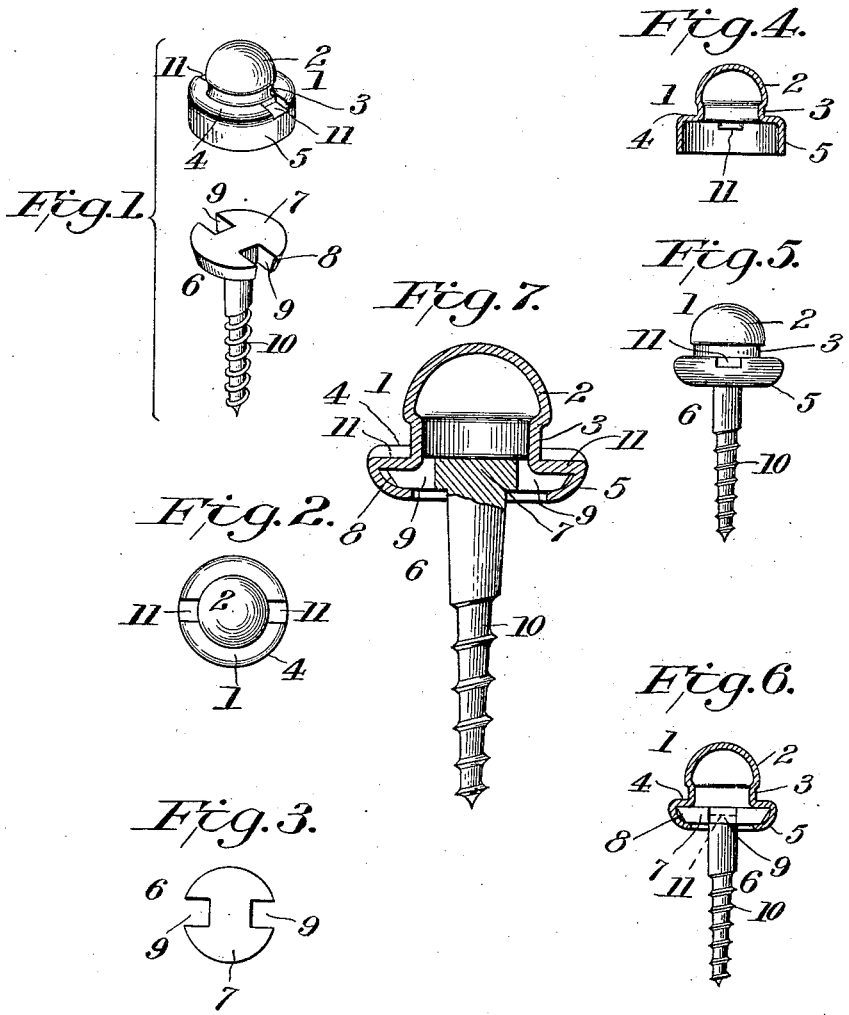

ERNEST D. SIMONS, OF WATERBURY, CONNECTICUT, ASSIGNOR TO SCOVILL MANUFACTURING COMPANY, OF WATERBURY, CONNECTICUT, A CORPORATION OF CONNECTICUT.

SCREW-STUD FOR SNAP-FASTENERS.

1,048,902.   Specification of Letters Patent.   Patented Dec. 31, 1912.

Application filed October 19, 1911. Serial No. 655,593.

*To all whom it may concern:*

Be it known that I, ERNEST D. SIMONS, a citizen of the United States, residing at Waterbury, in the county of New Haven and State of Connecticut, have invented a certain new and useful Improvement in Screw-Studs for Snap-Fasteners, of which the following is a full, clear, and exact description.

Snap fasteners comprising a socket member and a head or stud member, one or the other of which is a spring, are used for a variety of purposes, including the fastening down of curtains for carriages, motor vehicles, and the like. Ordinarily the socket member for curtain fasteners is a spring, and the stud member is rigid, the socket member being applied to the curtain and the stud member to the body. To so apply the stud, it has been provided with a screw which must be driven in place. Various expedients have been devised to apply the stud to a screw so that the two will turn together with a wrench or screw-driver of some sort. This invention is designed to so connect the stud and screw that a spanner wrench may be used to set it without possibility of displacing the stud.

The invention consists of a screw-stud in which the head of the screw has peripheral notches, preferably two such notches, diametrically placed, and the stud has its flange closed about this head with portions sunk in said notches, thereby securely uniting the two against the possibility of independent rotation or displacement otherwise, and affording nicks to receive the fingers of a spanner wrench to turn the screw so as to set it in a wooden or other body.

In the accompanying drawings, illustrating the invention, in the several figures of which like parts are similarly designated, Figure 1 is a perspective view of the stud and screw detached. Fig. 2 is a top plan view of the stud. Fig. 3 is a top plan view of the screw. Fig. 4 is a cross-section of the stud taken at right angles to its nicks. Fig. 5 is a side elevation of the screw stud complete. Fig. 6 is an elevation of the screw stud with the stud in cross-section. Fig. 7 is a cross-section taken through the spanner nicks, of the complete screw-stud, on a larger scale.

The stud 1 has the head portion 2 of dome shape, as usual; the constricted neck 3, the lateral flange 4, and the vertical attaching flange 5.

The screw 6 has the head 7 of any approved form, preferably flat and with the beveled edge 8, and this head has two, more or less, notches 9 extending inwardly from its edge and through from top to bottom. The screw shank 10 may be a wood or metal screw as desired.

The stud may have the preformed nicks 11 to engage the notches 9; or these nicks may be made after assembling the stud and screw; or the nicks may be partly formed in the stud and then driven farther down into the notches after assembling; but in any case the nicks so engage the notches as to fix the stud upon the screw head against the possibility of independent movement of the stud and screw, and to afford adequate nicks or sockets to receive the fingers of a spanner wrench so as to permit of the screw stud being properly set, without affecting the stability of the union of the stud and screw. The stud is applied to the screw head by closing its flange 5 about the screw head substantially as shown, with its nicks in the notches of the screw head.

Aside from the permanence of the union of stud and screw afforded by this construction, there is the added advantage of economy in manufacture over those screw studs having polygonal joints and requiring polygonal wrenches to set them. Any suitable resilient socket may be used with the form of stud herein shown.

While it is customary to use a resilient socket and rigid head or stud in this class of fasteners, still it is within the scope of this invention to use a rigid socket and a resilient head or stud, both constructions being equally well known.

What I claim is:—

A screw-stud, consisting of a screw member provided with a head having opposite notches in its edge, and a stud member having a flange which is closed about such notched head and has portions of its substance sunk in said notches thereby uniting the screw member and the stud member and interlocking them so as to cause them to turn together and affording nicks to receive a spanner to effect such turning.

In testimony whereof I have hereunto set my hand this 18th day of October, A. D. 1911.

ERNEST D. SIMONS.

Witnesses:
E. A. HYDE,
PERCY WARNER.

Copies of this patent may be obtained for five cents each, by addressing the "Commissioner of Patents, Washington, D. C."